United States Patent
Yoshida

(10) Patent No.: US 12,392,617 B2
(45) Date of Patent: Aug. 19, 2025

(54) WATER AREA OBJECT DETECTION SYSTEM, MARINE VESSEL, AND SURROUNDING OBJECT DETECTION SYSTEM

(71) Applicant: YAMAHA HATSUDOKI KABUSHIKI KAISHA, Iwata (JP)

(72) Inventor: Kazumichi Yoshida, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 372 days.

(21) Appl. No.: 18/092,964

(22) Filed: Jan. 4, 2023

(65) Prior Publication Data

US 2023/0228575 A1 Jul. 20, 2023

(30) Foreign Application Priority Data

Jan. 14, 2022 (JP) ................................. 2022-004596

(51) Int. Cl.
*G01C 21/20* (2006.01)
*B63B 79/40* (2020.01)
*G06V 10/771* (2022.01)

(52) U.S. Cl.
CPC ............ *G01C 21/203* (2013.01); *B63B 79/40* (2020.01); *G06V 10/771* (2022.01)

(58) Field of Classification Search
CPC ..... G01C 21/203; B63B 79/40; G06V 10/771
USPC ........................................................... 701/21
See application file for complete search history.

(56) References Cited

U.S. PATENT DOCUMENTS

| 10,372,976 | B2 * | 8/2019 | Kollmann | ............... B63B 79/10 |
| 2009/0271054 | A1 * | 10/2009 | Dokken | ................ G01S 13/937 |
| | | | | 701/21 |
| 2018/0342100 | A1 * | 11/2018 | Mollis | .................... G06T 3/4038 |
| 2019/0308712 | A1 | 10/2019 | Akuzawa et al. | |
| 2021/0406560 | A1 | 12/2021 | Park et al. | |
| 2023/0068036 | A1 * | 3/2023 | Park | ......................... G06F 18/21 |

(Continued)

FOREIGN PATENT DOCUMENTS

| EP | 4 053 822 A1 | 9/2022 |
| JP | 2021-71800 A | 5/2021 |

OTHER PUBLICATIONS

Kou et al., "3D Environment Recognition and Mapping for Autonomous Mobile Robots", the 66th National Meeting of the Information Processing Society of Japan, Mar. 9, 2004, 2 pages.

(Continued)

*Primary Examiner* — Yazan A Soofi
(74) *Attorney, Agent, or Firm* — Keating & Bennett, LLP

(57) ABSTRACT

A water area object detection system includes an imager to capture an image around a hull, and a controller configured or programmed to perform a control to detect a feature point corresponding to an object in the image together with a distance to the feature point based on the image captured by the imager to create a water area map in which an object presence range including a likelihood that the object is present is set around the feature point. The controller is configured or programmed to reduce the object presence range as the distance from the imager to the feature point decreases, and set a size of the object presence range to a lower limit when the distance from the imager to the feature point is equal to or less than a predetermined distance.

20 Claims, 5 Drawing Sheets

(56) References Cited

U.S. PATENT DOCUMENTS

2023/0228576 A1* 7/2023 Ishii ................. B63B 49/00
   701/21
2025/0044102 A1* 2/2025 Bergenwall .......... G01C 21/203

OTHER PUBLICATIONS

Extended European Search Report in EP23150776.5, mailed Jun. 16, 2023, 13 pages.
Se et al., "Mobile Robot Localization and Mapping with Uncertainty using Scale-Invariant Visual Landmarks," The International Journal of Robotics Research, vol. 21, No. 8, Aug. 31, 2002, pp. 735-758.

* cited by examiner

MODIFIED EXAMPLE

WATER AREA OBJECT DETECTION SYSTEM, MARINE VESSEL, AND SURROUNDING OBJECT DETECTION SYSTEM

CROSS REFERENCE TO RELATED APPLICATIONS

This application claims the benefit of priority to Japanese Patent Application No. 2022-004596 filed on Jan. 14, 2022. The entire contents of this application are hereby incorporated herein by reference.

BACKGROUND OF THE INVENTION

1. Field of the Invention

The present invention relates to a water area object detection system, a marine vessel, and a surrounding object detection system, and more particularly, it relates to a water area object detection system, a marine vessel, and a surrounding object detection system, each of which includes an imager and creates a surrounding map based on an image captured by the imager.

2. Description of the Related Art

An autonomous mobile robot that includes an imager and creates an environment map (surrounding map) based on an image captured by the imager is known in general. Such an autonomous mobile robot is disclosed by Tatsunori Kou, Kenji Suzuki, and Shuji Hashimoto, Department of Applied Physics, Waseda University, "3D Environment Recognition and Mapping for Autonomous Mobile Robots", the 66th National Meeting of the Information Processing Society of Japan, pages 2-453 to 2-454, for example.

Tatsunori Kou, Kenji Suzuki, and Shuji Hashimoto, Department of Applied Physics, Waseda University, "3D Environment Recognition and Mapping for Autonomous Mobile Robots", the 66th National Meeting of the Information Processing Society of Japan, pages 2-453 to 2-454 disclose an autonomous mobile robot including an imager and a controller. The controller of the autonomous mobile robot creates a surrounding environment map (surrounding map) by detecting the posture and position of the autonomous mobile robot and a distance to an object around the autonomous mobile robot based on an image captured by the imager. At this time, the controller detects a measurement point (feature point) indicating an object, sets around the measurement point a probability distribution range (object presence range) in which the object around the autonomous mobile robot is probabilistically distributed, and shows the probability distribution range on the environment map. That is, a range in which an object that interferes with movement of the autonomous mobile robot is probably present, which is the probability distribution range in which the object is probabilistically distributed, is shown on the environment map.

The controller increases the probability distribution range (object presence range) as the distance from the imager to the object increases taking into account a distance measurement error. Specifically, the distance measurement error becomes greater as the distance from the imager to the object increases, and thus the controller also increases the probability distribution range (object presence range) according to the distance measurement error. Conversely, the distance measurement error becomes smaller as the distance from the imager to the object decreases, and thus the controller also reduces the probability distribution range (object presence range) according to the distance measurement error.

Although not clearly described by Tatsunori Kou, Kenji Suzuki, and Shuji Hashimoto, Department of Applied Physics, Waseda University, "3D Environment Recognition and Mapping for Autonomous Mobile Robots", the 66th National Meeting of the Information Processing Society of Japan, pages 2-453 to 2-454, a technique to create an environment map (surrounding map) around a mobile body using an imager includes a technique to create an environment map in consideration of the real-time characteristics (responsiveness) of control by detecting a small number of measurement points (feature points) indicating objects from a captured image.

When the environment map creation technique described above to decrease the number of measurement points in consideration of the real-time characteristics of control is used in the autonomous mobile robot described by Tatsunori Kou, Kenji Suzuki, and Shuji Hashimoto, Department of Applied Physics, Waseda University, "3D Environment Recognition and Mapping for Autonomous Mobile Robots", the 66th National Meeting of the Information Processing Society of Japan, pages 2-453 to 2-454, a probability distribution range (object presence range) in which an object around the autonomous mobile robot is probabilistically distributed becomes smaller according to a distance measurement error as the imager is closer to the object, and thus the probability distribution range (object presence range) may become too small. Consequently, the probability distribution range (object presence range) may not include a portion in which the object is originally present, and a gap may occur between adjacent probability distribution ranges (object presence ranges). Therefore, it is desired to create an environment map that more accurately indicates an object near the imager.

SUMMARY OF THE INVENTION

Preferred embodiments of the present invention provide water area object detection systems, marine vessels, and surrounding object detection systems that each create water area maps (surrounding maps) that more accurately indicate objects near imagers.

A water area object detection system according to a preferred embodiment of the present invention includes an imager provided on a hull to capture an image around the hull, and a controller configured or programmed to perform a control to detect a feature point corresponding to an object in the image together with a distance to the feature point based on the image captured by the imager to create a water area map in which an object presence range including a likelihood that the object is present is set around the feature point. The controller is configured or programmed to reduce the object presence range as the distance from the imager of the hull to the feature point corresponding to the object decreases, and set a size of the object presence range to a lower limit when the distance from the imager to the feature point is equal to or less than a predetermined distance.

A water area object detection system according to a preferred embodiment of the present invention includes the controller configured or programmed to create the water area map in which the object presence range including a likelihood that the object is present is set, and the controller is configured or programmed to reduce the object presence range as the distance from the imager of the hull to the feature point corresponding to the object decreases, and set the size of the object presence range to the lower limit when the distance from the imager to the feature point is equal to or less than the predetermined distance. Accordingly, when the imager is relatively near the object such that the distance from the imager to the feature point is equal to or less than the predetermined distance, the size of the object presence range is set to the lower limit, and thus an excessive reduction in the object presence range is prevented. Therefore, the possibility that in the water area map, a portion in which the object is originally present is not included in the object presence range, and a gap occurs between adjacent object presence ranges is reduced or prevented. Therefore, the water area map that more accurately indicates the object near the imager is created.

In a water area object detection system according to a preferred embodiment of the present invention, the lower limit is preferably set such that a plurality of the object presence ranges for a plurality of the feature points corresponding to the same object partially overlap each other when the distance from the imager to the feature point is equal to or less than the predetermined distance. Accordingly, when the distance from the imager to the feature point is equal to or less than the predetermined distance, i.e., when each of the plurality of object presence ranges for the plurality of feature points corresponding to the same object is relatively small, the plurality of object presence ranges partially overlap each other, and thus the possibility that a portion in which the object is originally present is not included in the object presence range, and a gap occurs between the adjacent object presence ranges is more reliably reduced or prevented. Therefore, the water area map that still more accurately indicates the object near the imager is created.

In a water area object detection system according to a preferred embodiment of the present invention, the controller is preferably configured or programmed to automatically dock the hull by automatically moving the hull toward a shore structure corresponding to the object. Accordingly, the hull is easily docked at the shore structure.

In such a case, the controller is preferably configured or programmed to, when an obstacle corresponding to the object is present between the hull and the shore structure when the hull is automatically docked, set the size of the object presence range to the lower limit or more, set a movement route that avoids the object presence range around the feature point corresponding to the obstacle, and automatically move the hull along the movement route. Accordingly, the sizes of the plurality of object presence ranges indicating the shore structure are set to the lower limit or more, and thus a gap between the plurality of object presence ranges indicating the shore structure is filled. Consequently, when the hull is automatically docked at the shore structure, contact of the hull with the obstacle is reduced or prevented.

In a water area object detection system according to a preferred embodiment of the present invention, the controller is preferably configured or programmed to change the size of the object presence range according to a distance measurement error that quadratically becomes greater as the distance from the imager to the feature point increases when the distance from the imager to the feature point is larger than the predetermined distance. Accordingly, when the distance from the imager to the feature point is larger than the predetermined distance, the size of the object presence range is set to an appropriate size in consideration of the distance measurement error. Therefore, the water area map that more accurately indicates the object imaged by the imager is created.

In a water area object detection system according to a preferred embodiment of the present invention, the controller is preferably configured or programmed to create the two-dimensional water area map to be horizontally extending by setting the object presence range in a horizontal plane. Accordingly, as compared with a case in which a three-dimensional water area map is created in consideration of an upward-downward direction (height direction), the processing load on the controller is reduced, and thus the real-time characteristics (responsiveness) of control is improved.

In a water area object detection system according to a preferred embodiment of the present invention, the controller is preferably configured or programmed to redetect the feature point corresponding to the object in the image together with the distance to the feature point for each predetermined number of imaging frames of the imager to update the water area map. Accordingly, when an estimation method such as Bayesian estimation is performed, the posterior probability is converged in an earlier stage (an area in which the object is present has a higher probability, and an area in which the object is absent has a lower probability).

In such a case, the controller is preferably configured or programmed to update the water area map using Bayesian estimation, and assign a current probability larger than an initial probability and a prior probability to the object presence range and assign a current probability smaller than the initial probability and the prior probability to a range outside the object presence range to calculate a posterior probability using the Bayesian estimation. Accordingly, even when noise such as bubbles occurs in a predetermined frame, Bayesian estimation is repeatedly performed to update the water area map such that the probability that the noise such as bubbles is present in the water area map is reduced after the noise disappears. Therefore, the noise is reliably removed from the water area map.

In a water area object detection system according to a preferred embodiment of the present invention, the imager preferably includes two imaging light receivers spaced apart at different locations on the hull, and the controller is preferably configured or programmed to measure the distance from the imager to the feature point using the two imaging light receivers. Accordingly, two different images are captured simultaneously by the two imaging light receivers to measure the distance to the feature point by the triangulation method, and thus as compared with a case in which two images are captured from different locations at different times by a single imaging apparatus to measure the distance to the feature point by the triangulation method, the accuracy of distance measurement is improved.

A water area object detection system according to a preferred embodiment of the present invention preferably further includes a display provided on the hull to display the water area map, and the controller is preferably configured or programmed to perform a control to display the feature point in one pixel of the display and set the object presence range having a perfect circular shape around the one pixel in which the feature point is displayed to display the feature point and the object presence range on the display. Accordingly, the boundary of the object presence range is set at positions to which distances from the feature point are equal to each other, and the water area map that more accurately indicates the object imaged by the imager is created.

In a water area object detection system according to a preferred embodiment of the present invention, the controller is preferably configured or programmed to set the predetermined distance to about 15 m or more and about 25 m or less, and set the size of the object presence range to the lower limit when the distance from the imager to the feature point is equal to or less than the predetermined distance. Accordingly, the size of the object presence range is set to the lower limit within a predetermined range from the imager to the feature point with the predetermined distance of about 15 m or more and about 25 m or less, which is relatively close to the hull, and the water area map that more accurately indicates the object is created.

A marine vessel according to a preferred embodiment of the present invention includes a hull, and a water area object detection system provided on or in the hull. The water area object detection system includes an imager provided on the hull to capture an image around the hull, and a controller configured or programmed to perform a control to detect a feature point corresponding to an object in the image together with a distance to the feature point based on the image captured by the imager to create a water area map in which an object presence range including a likelihood that the object is present is set around the feature point. The controller is configured or programmed to reduce the object presence range as the distance from the imager of the hull to the feature point corresponding to the object decreases, and set a size of the object presence range to a lower limit when the distance from the imager to the feature point is equal to or less than a predetermined distance.

A marine vessel according to a preferred embodiment of the present invention includes the controller configured or programmed to create the water area map in which the object presence range including a likelihood that the object is present is set, and the controller is configured or programmed to reduce the object presence range as the distance from the imager of the hull to the feature point corresponding to the object decreases, and set the size of the object presence range to the lower limit when the distance from the imager to the feature point is equal to or less than the predetermined distance. Accordingly, when the imager is relatively near the object such that the distance from the imager to the feature point is equal to or less than the predetermined distance, the size of the object presence range is set to the lower limit, and thus an excessive reduction in the object presence range is prevented. Therefore, the possibility that in the water area map, a portion in which the object is originally present is not included in the object presence range, and a gap occurs between adjacent object presence ranges is reduced or prevented. Therefore, the water area map that more accurately indicates the object near the imager is created.

In a marine vessel according to a preferred embodiment of the present invention, the lower limit is preferably set such that a plurality of the object presence ranges set for a plurality of the feature points corresponding to the same object partially overlap each other when the distance from the imager to the feature point is equal to or less than the predetermined distance. Accordingly, when the distance from the imager to the feature point is equal to or less than the predetermined distance, i.e., when each of the plurality of object presence ranges set for the plurality of feature points corresponding to the same object is relatively small, the plurality of object presence ranges partially overlap each other, and thus the possibility that a portion in which the object is originally present is not included in the object presence range, and a gap occurs between the adjacent object presence ranges is more reliably reduced or prevented. Therefore, the water area map that still more accurately indicates the object near the imager is created.

In a marine vessel according to a preferred embodiment of the present invention, the controller is preferably configured or programmed to automatically dock the hull by automatically moving the hull toward a shore structure corresponding to the object. Accordingly, the hull is easily docked at the shore structure.

In such a case, the controller is preferably configured or programmed to, when an obstacle corresponding to the object is present between the hull and the shore structure when the hull is automatically docked, set the size of the object presence range to the lower limit or more, set a movement route that avoids the object presence range around the feature point corresponding to the obstacle, and automatically move the hull along the movement route. Accordingly, the sizes of the plurality of object presence ranges indicating the shore structure are set to the lower limit or more, and thus a gap between the plurality of object presence ranges indicating the shore structure is filled. Consequently, when the hull is automatically docked at the shore structure, contact of the hull with the obstacle is reduced or prevented.

In a marine vessel according to a preferred embodiment of the present invention, the controller is preferably configured or programmed to change the size of the object presence range according to a distance measurement error that quadratically becomes greater as the distance from the imager to the feature point increases when the distance from the imager to the feature point is larger than the predetermined distance. Accordingly, when the distance from the imager to the feature point is larger than the predetermined distance, the size of the object presence range is set to an appropriate size in consideration of the distance measurement error. Therefore, the water area map that more accurately indicates the object imaged by the imager is created.

In a marine vessel according to a preferred embodiment of the present invention, the controller is preferably configured or programmed to create the two-dimensional water area map to be horizontally extending by setting the object presence range in a horizontal plane. Accordingly, as compared with a case in which a three-dimensional water area map is created in consideration of an upward-downward direction (height direction), the processing load on the controller is reduced, and thus the real-time characteristics (responsiveness) of control is improved.

In a marine vessel according to a preferred embodiment of the present invention, the controller is preferably configured or programmed to redetect the feature point corresponding to the object in the image together with the distance to the feature point for each predetermined number of imaging frames of the imager to update the water area map. Accordingly, when an estimation method such as Bayesian estimation is performed, the posterior probability is converged in an earlier stage (an area in which the object is present has a higher probability, and an area in which the object is absent has a lower probability).

In such a case, the controller is preferably configured or programmed to update the water area map using Bayesian estimation, and assign a current probability larger than an initial probability and a prior probability to the object presence range and assign a current probability smaller than the initial probability and the prior probability to a range outside the object presence range to calculate a posterior probability using the Bayesian estimation. Accordingly, even when noise such as bubbles occurs in a predetermined frame, Bayesian estimation is repeatedly performed to update the water area map such that the probability that the noise such as bubbles is present in the water area map is reduced after the noise disappears. Therefore, the noise is reliably removed from the water area map.

A surrounding object detection system according to a preferred embodiment of the present invention includes an imager provided on a mobile body to capture an image around the mobile body, and a controller configured or programmed to perform a control to detect a feature point corresponding to an object in the image together with a distance to the feature point based on the image captured by the imager to create a surrounding map in which an object presence range including a likelihood that the object is present is set around the feature point. The controller is configured or programmed to reduce the object presence range as the distance from the imager of the mobile body to the feature point corresponding to the object decreases, and set a size of the object presence range to a lower limit when the distance from the imager to the feature point is equal to or less than a predetermined distance.

A surrounding object detection system according to a preferred embodiment of the present invention includes the controller configured or programmed to create the surrounding map in which the object presence range including a likelihood that the object is present is set, and the controller is configured or programmed to reduce the object presence range as the distance from the imager of the mobile body to the feature point corresponding to the object decreases, and set the size of the object presence range to the lower limit when the distance from the imager to the feature point is equal to or less than the predetermined distance. Accordingly, when the imager is relatively near the object such that the distance from the imager to the feature point is equal to or less than the predetermined distance, the size of the object presence range is set to the lower limit, and thus an excessive reduction in the object presence range is prevented. Therefore, the possibility that in the surrounding map a portion in which the object is originally present is not included in the object presence range, and a gap occurs between adjacent object presence ranges is reduced or prevented. Therefore, the surrounding map that more accurately indicates the object near the imager is created.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

The structure of a marine vessel 100 including a water area object detection system 103 according to preferred embodiments of the present invention is now described with reference to FIGS. 1 to 8. The water area object detection system 103 is an example of a "surrounding object detection system".

In the figures, arrow FWD represents the forward movement direction of the marine vessel 100 (front side with reference to a hull 101), and arrow BWD represents the reverse movement direction of the marine vessel 100 (rear side with reference to the hull 101). The hull 101 is an example of a "mobile body".

In the figures, arrow L represents the portside direction of the marine vessel 100 (left side with respect to the hull 101), and arrow R represents the starboard direction of the marine vessel 100 (right side with respect to the hull 101).

Figure 1:
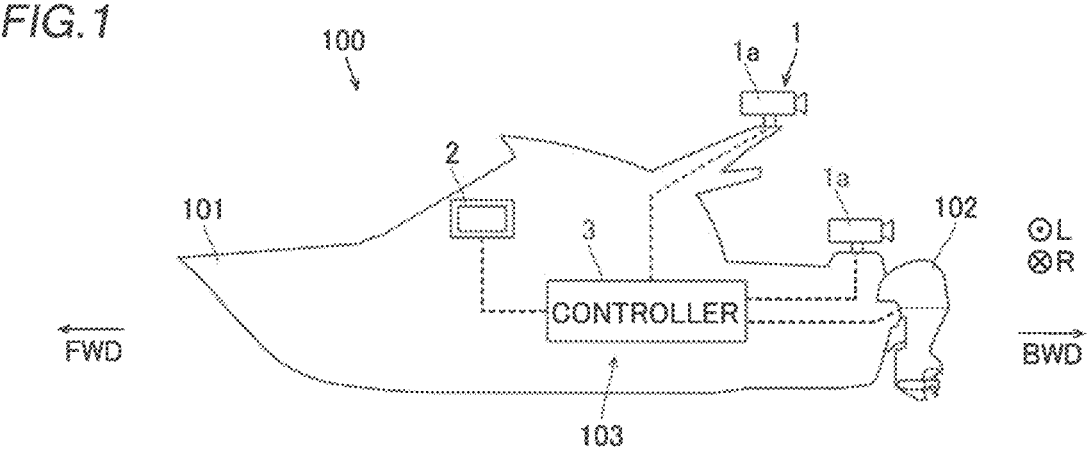
FIG. 1 is a side view showing a marine vessel including a water area object detection system according to a preferred embodiment of the present invention.

As shown in FIG. 1, the marine vessel 100 includes the hull 101, a marine propulsion device 102 provided on the hull 101, and the water area object detection system 103 provided on or in the hull 101.

The marine propulsion device 102 is attached to a transom of the hull 101 from behind. That is, in preferred embodiments of the present invention, the marine propulsion device 102 is an outboard motor, and the marine vessel 100 is an outboard motor boat.

The marine vessel 100 performs a control to estimate the self-position of the hull 101 in the water area map M while creating a two-dimensional water area map M (see FIG. 2) around the hull 101 that extends horizontally, using the water area object detection system 103. The water area map M is an example of a "surrounding map".

As an example, the control described above (the control to estimate the self-position of the hull 101 in the water area map M while creating the water area map M) is achieved by simultaneous localization and mapping (SLAM).

The SLAM is a technique to simultaneously create an environment map around a mobile device and estimate the self-position of the mobile device in the environment map using an image captured by a camera installed on the mobile device, for example. Unlike estimation of a self-position on a map using a global positioning system (GPS), for example, estimation of the self-position of the mobile device using the SLAM is able to be performed even in an environment such as indoors in which a GPS or the like is not usable.

The SLAM enables the mobile device to move while avoiding surrounding objects so as to not collide with the objects, and to move along an optimal movement route without duplication of routes, for example.

The SLAM includes passive SLAM (such as so-called visual SLAM) that uses an image sensor such as a camera to image a surrounding object, and active SLAM (such as so-called LiDAR SLAM) performed by irradiating a surrounding object with a laser beam of a laser device and detecting the reflected laser beam. The marine vessel 100 according to preferred embodiments of the present invention performs a control using a technique such as the former passive SLAM.

The passive SLAM using an image sensor such as a camera includes a structure to acquire dense detection data and a structure to acquire sparse detection data. The structure to acquire dense detection data requires a larger amount of data processing in a controller as compared with the structure to acquire sparse detection data. The sparse detection data refers to data obtained by extracting a feature point that is a portion of an image captured by an image sensor such as a camera, for example.

The marine vessel 100 according to a preferred embodiment of the present invention performs a control using the SLAM to acquire the latter sparse detection data. Consequently, the marine vessel 100 computes acquired detection data more quickly, and performs a real-time control according to movement of the marine vessel 100. That is, the marine vessel 100 performs a highly responsive (real-time) control.

Figure 2:
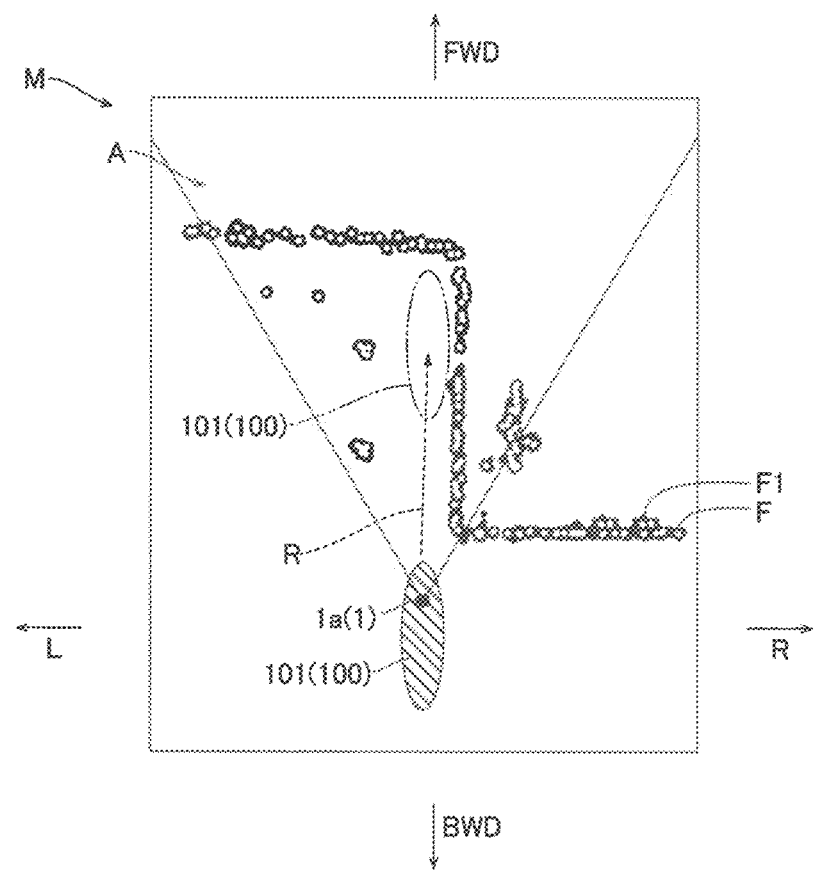
FIG. 2 is a diagram showing a water area map created by a water area object detection system according to a preferred embodiment of the present invention.
Figure 3:
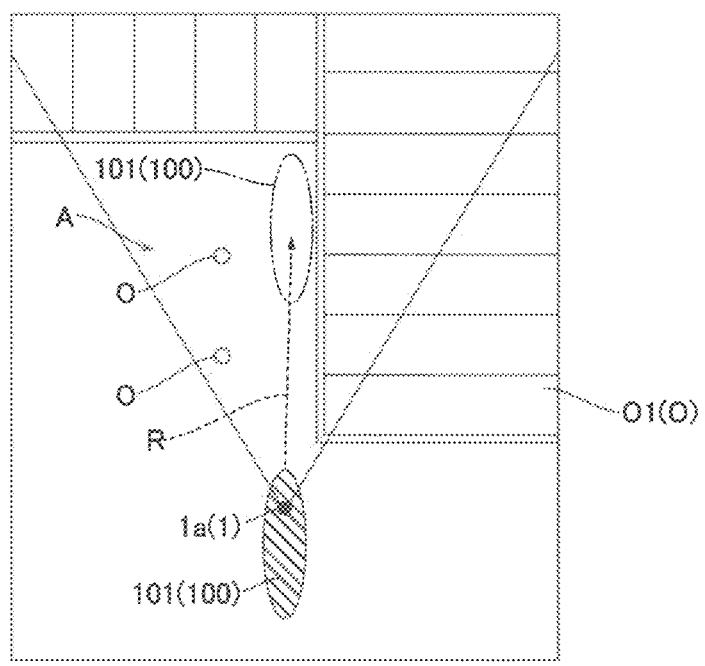
FIG. 3 is a plan view illustrating an actual object (such as a structure) in a range corresponding to a water area map.

As shown in FIGS. 2 and 3, the marine vessel 100 performs a control to automatically move while avoiding obstacles (objects O) along a movement route R using the water area map M created using the water area object detection system 103 and a control to automatically dock the hull 101 at a shore structure O1 such as a floating pier.

The marine vessel 100 uses the water area map M as a way to know the positions of the obstacles (objects O) not only when the marine vessel 100 automatically moves but also when a user manually maneuvers the marine vessel 100. That is, the water area map M is a so-called cost map to indicate the positions of the obstacles (objects O) that are present around the marine vessel 100, for example.

The water area object detection system 103 includes an imager 1 provided on the hull 101, a display 2 provided on the hull 101, and a controller 3 (see FIG. 1).

Figure 4:
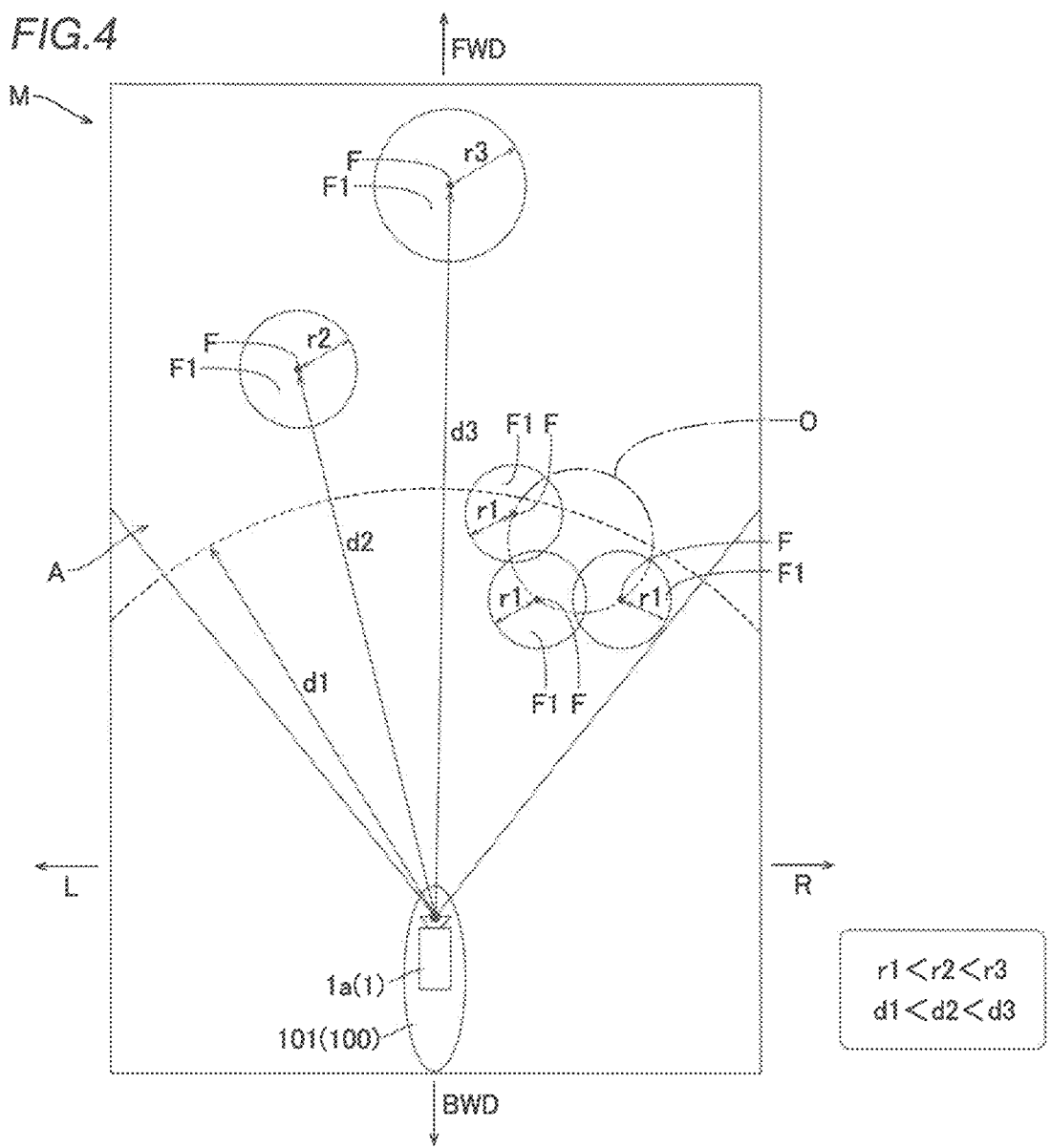
FIG. 4 is a schematic view illustrating the size of an object presence range on a water area map.

As shown in FIG. 4, the water area object detection system 103 performs a control to create the water area map M in which an object presence range F1 including a likelihood that an object O is present is set around a feature point F by detecting, based on an image captured by the imager 1, the feature point F corresponding to the object O in the image together with a distance to the feature point F.

The imager 1 captures an image around the hull 101. The imager 1 includes two imaging light receivers 1a spaced apart at different locations on the hull 101. Each imaging light receiver 1a includes a monocular camera including an imaging device such as a CCD sensor or a CMOS sensor.

The water area object detection system 103 (including controller 3) measures a distance from the imager 1 to the feature point F using the two imaging light receivers 1a. Specifically, the water area object detection system 103 (including controller 3) measures the distance to the feature point F corresponding to the object O in an image captured by a triangulation method based on images captured by the two imaging light receivers 1a.

The "feature point F corresponding to the object O in an image" refers to a specific point shown in a portion of the image in which the object O is located. As an example, the feature point F is set in a portion of the image in which there is a particularly large change in brightness or color tone.

The water area object detection system 103 preliminarily performs distortion correction of images captured by the two imaging light receivers 1a, rectification to associate the images with each other, and parallax estimation by matching corresponding feature points F on the images, for example, as preprocessing for distance measurement by the triangulation method.

Figure 5:
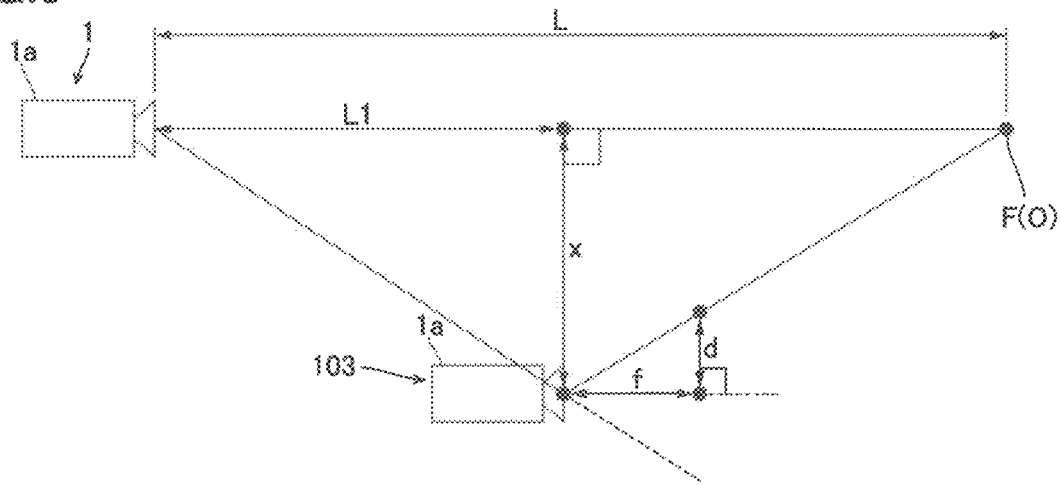
FIG. 5 is a diagram illustrating a triangulation method using two imaging light receivers.
Figure 6:
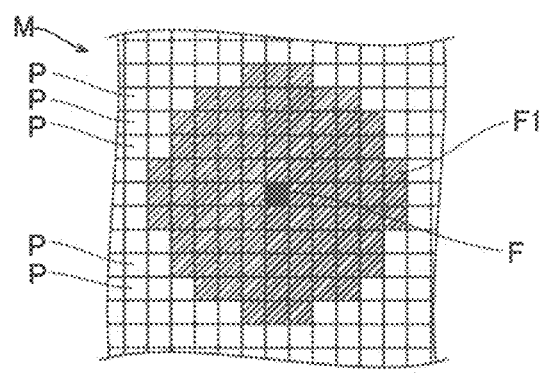
FIG. 6 is an enlarged view showing a feature point and an object presence range on a water area map.

Measurement of the distance to the feature point F by the triangulation method performed by the water area object detection system 103 is now described with reference to FIG. 5.

Assuming that L1 represents a distance in a horizontal direction between the two imaging light receivers 1a, x represents a distance in a direction perpendicular to the horizontal direction between the two imaging light receivers 1a, d represents the parallax of the two imaging light receivers 1a, p represents the element pitches of the imaging devices of the imaging light receivers 1a, and f represents a focal length of one of the imaging light receivers 1a, a distance L in the horizontal direction from the other of the imaging light receivers 1a to the feature point F (object O) is obtained by the following formula. When the two imaging light receivers 1a are provided side by side like a stereo camera, L1=0.

Mathematical Formula 1

$$L = \frac{fx}{pd} + L1 \qquad (1)$$

A displacement amount ΔL of a measurement distance in a case in which the parallax d is shifted by one pixel in the images captured by the two imaging light receivers 1a is obtained by the following formula.

Mathematical Formula 2

$$\Delta L = \frac{fx}{pd(d+1)} \qquad (2)$$

From the above formula showing the displacement amount ΔL of the measurement distance, it is understood that the displacement amount ΔL of the measurement distance increases as the parallax d decreases, and the displacement amount ΔL of the measurement distance decreases as the parallax d increases. This displacement amount ΔL of the measurement distance corresponds to a distance resolution at the time of measuring the distance L. That is, as the distance L in the horizontal direction from the imaging light receiver 1a to the feature point F increases, a distance measurement error becomes greater. The distance measurement error quadratically becomes greater as the distance L increases.

As shown in FIG. 2, the display 2 (see FIG. 1) displays the water area map M created by the controller 3 (see FIG. 1). As an example, the display 2 displays the water area map M within a display image of, for example, 450 pixels wide by 600 pixels long. The display image of 450 pixels wide by 600 pixels long is a display image in which a point group is plotted in a world coordinate system. As an example, the size of one pixel of the water area map M corresponds to a size of 0.1 m horizontally and 0.1 m vertically in the world coordinate system.

The display 2 displays the imager 1 (imaging light receiver 1a) at a predetermined pixel position of the water area map M in a predetermined orientation. The display 2 also displays the hull 101 together with the imager 1 on the water area map M. The display 2 displays a schematic model of the hull 101 on the water area map M.

The display 2 displays the feature points F on the water area map M. Furthermore, the display 2 displays, on the water area map M, the object presence range F1 around the feature point F and including a likelihood that the object O is present. As a specific example, the controller 3 performs a control to display one feature point F in one pixel P of the display 2 and set a perfect circular object presence range F1 around one pixel P in which the feature point F is displayed to display the feature point F and the perfect circular object presence range F1 on the display 2 (see FIG. 6).

The object presence range F1 refers to a range around the feature point F and including a likelihood that the object O is present. In short, the object presence range F1 refers to a range in which the object O is probabilistically present. In other words, the object presence range F1 should be avoided when the marine vessel 100 moves, and a movement route R (see FIGS. 2 and 8) for automatic movement is not set in the object presence range F1.

The display 2 displays an imaging area A with a predetermined angle of view indicating a range currently being imaged by the imager 1 on the water area map M.

The controller 3 (see FIG. 1) includes a circuit board including a central processing unit (CPU), a read-only memory (ROM), a random access memory (RAM), etc., for example. The controller 3 is provided in the hull 101. The controller 3 is connected to the two imaging light receivers 1a, the display 2, and the marine propulsion device 102 by signal lines.

The controller 3 performs a control to automatically move the hull 101 by setting the movement route R for automatic movement based on the created water area map M and controlling driving of the marine propulsion device 102.

As described above, the controller 3 performs a control to create the water area map M in which the perfect circular object presence range F1 including a likelihood that the object O is present is set around the feature point F by detecting the feature point F corresponding to the object O in the image together with the distance to the feature point F based on the image captured by the imager 1.

The controller 3 creates the two-dimensional water area map M extending in the horizontal direction of the hull 101 by setting the object presence range F1 in a horizontal plane. That is, the controller 3 creates the two-dimensional water area map M extending in the forward-rearward direction and the right-left direction (arrows FWD, BWD, L, and R) of the hull 101.

Figure 7:
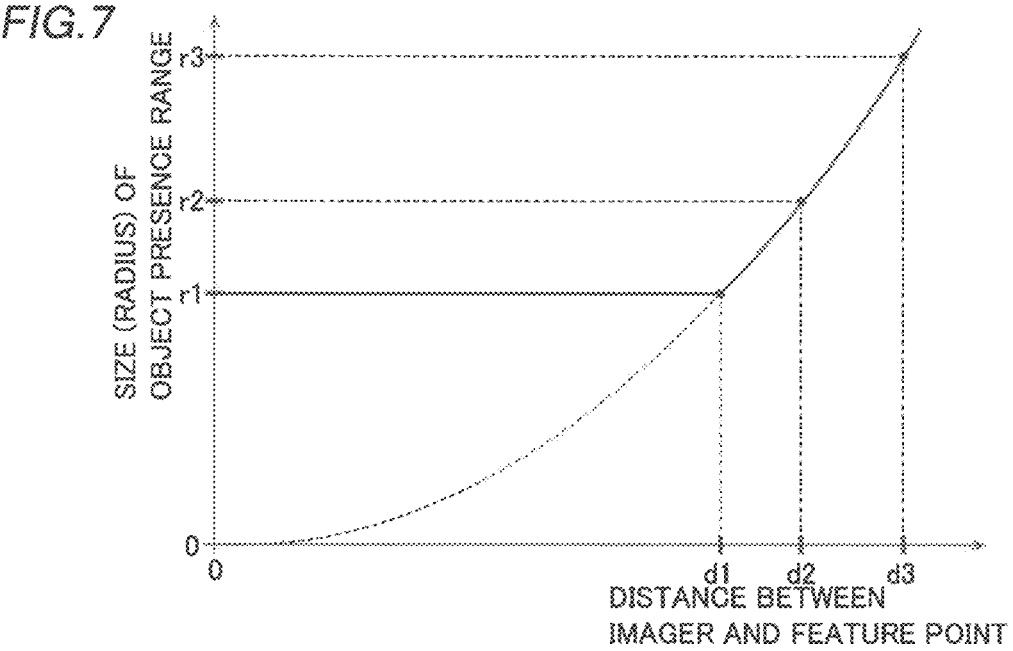
FIG. 7 is a graph showing a relationship between a distance between an imager and a feature point and the size of an object presence range.

As shown in FIGS. 4 and 7, when the two-dimensional water area map M is created, the controller 3 reduces the object presence range F1 as the distance from the imager 1 of the hull 101 to the feature point F corresponding to the object O decreases. When the distance from the imager 1 to the feature point F is equal to or less than a predetermined distance d1, the size of the object presence range F1 is set to a lower limit r1. In other words, the controller 3 sets a minimum value for the size of the object presence range F1 such that the size of the object presence range F1 does not become too small. The predetermined distance d1 refers to a distance to determine a range in which the size of the object presence range F1 is set to the lower limit.

The controller 3 changes the predetermined distance d1. As an example, the controller 3 sets the predetermined distance d1 to 15 m or more and 25 m or less, and sets the size of the object presence range F1 to the lower limit r1 when the distance from the imager 1 to the feature point F is equal to or less than the predetermined distance d1. As a specific example, the controller 3 sets the predetermined distance d1 to about 21 m, and sets the size of the object presence range F1 (a distance from the feature point F to the outer edge of the perfect circular object presence range F1, i.e., the radius of the object presence range F1) to the lower limit r1 when the distance from the imager 1 to the feature point F is equal to or less than the predetermined distance d1 (about 21 m). That is, in a range relatively close to the hull 101 in which the distance from the imager 1 to the feature point F is equal to or less than the predetermined distance d1, the size of the object presence range F1 is set to a constant lower limit r1.

When the distance from the imager 1 to the feature point F is equal to or less than the predetermined distance d1, the lower limit r1 is set such that a plurality of object presence ranges F1 for a plurality of feature points F corresponding to the same object O partially overlap each other. That is, the controller 3 reduces or prevents the occurrence of a gap between adjacent object presence ranges F1 of the plurality of object presence ranges F1 for the plurality of feature points F corresponding to the same object O. If the lower limit r1 is not set for the size of the object presence range, the object presence range continues to become smaller toward the feature point as the distance from the imager to the feature point decreases, and thus a gap is more likely to occur between the adjacent object presence ranges.

When the distance from the imager 1 to the feature point F is larger than the predetermined distance d1, the controller 3 changes the size of the object presence range according to the distance measurement error that quadratically becomes greater as the distance from the imager 1 to the feature point F increases (see FIG. 7).

As a specific example, the controller 3 increases the size of the object presence range F1 in proportion to the magnitude of the distance measurement error as the distance from the imager 1 to the feature point F increases when the distance from the imager 1 to the feature point F is larger than the predetermined distance d1.

For example, when the distance from the imager 1 to the feature point F is d2 larger than the predetermined distance d1, the controller 3 sets the size (radius) of the object presence range F1 to r2 larger than the lower limit r1. Furthermore, the controller 3 sets the size (radius) of the object presence range F1 to r3 larger than r2 when the distance from the imager 1 to the feature point F is d3 larger than the distance d2.

The controller 3 performs a control to redetect the feature point F corresponding to the object O in the image together with the distance to the feature point F for each imaging frame of the imager 1 and compare the detected feature point F with the currently used feature point F. The controller 3 performs a control to reject the detected feature point F and continue to use the currently used feature point F when the degree of change is smaller than a predetermined value, and performs a control to update the result to the newly detected feature point F and update the water area map M and the position of the imager 1 in the water area map M when the degree of change is conversely larger than the predetermined value. Furthermore, the controller 3 updates the water area map M every predetermined imaging frame (every ten frames, for example).

The controller 3 updates the water area map M using Bayesian estimation, for example. The controller 3 performs a Bayesian estimation for each pixel P and updates a presence probability indicating that the object O will be present at each pixel P. For example, the controller 3 assigns a current probability larger than an initial probability and a prior probability to the object presence range F1 and assigns a current probability smaller than the initial probability and the prior probability to a range (absence range) outside the object presence range F1 to calculate a posterior probability using Bayesian estimation. A formula for Bayesian estimation is "posterior probability=(current probability×prior probability)/initial probability".

As a specific example, a presence probability of "0.5" is assigned as the initial probability to all pixels P, and a presence probability of "1" is uniformly assigned to each pixel P in the object presence range F1, and a presence probability of "0.35" is uniformly assigned to the range outside the object presence range F1. The controller 3 sets the current probability and the initial probability to the same value to make the posterior probability equal to the prior probability in Bayesian estimation outside the range of the angle of view of the imager 1.

Figure 8:
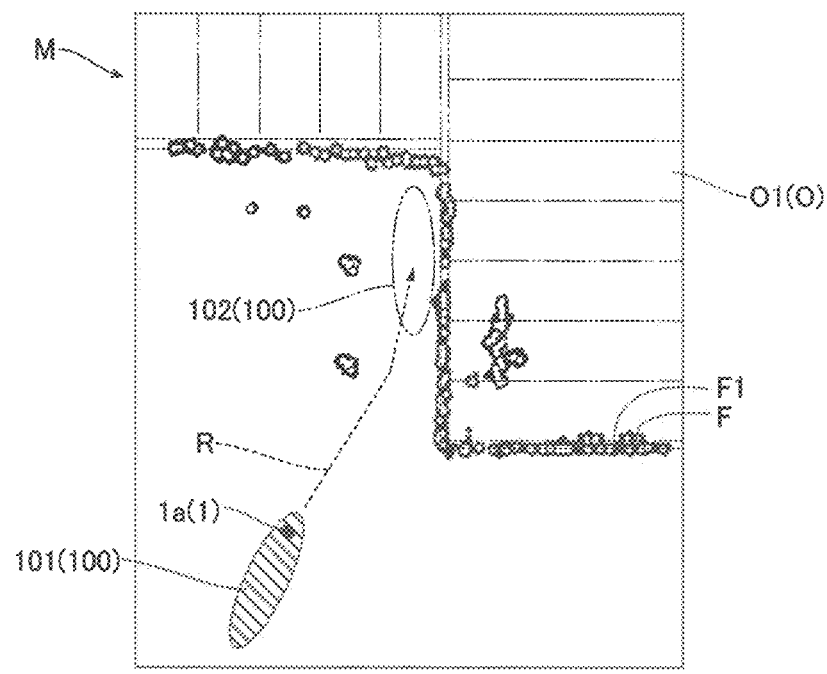
FIG. 8 is a diagram illustrating a movement route that avoids an object (obstacle).

As shown in FIGS. 2, 3, and 8, the controller 3 controls driving of the marine propulsion device 102 to move the hull 101.

As an example, the controller 3 automatically docks the hull 101 by automatically moving the hull 101 toward the shore structure O1 (see FIG. 3) corresponding to the object O. When automatically docking the hull 101, the controller 3 sets the size of the object presence range F1 to the lower limit r1 or more, sets the movement route R that avoids the object presence range F1 around the feature point F corresponding to an obstacle (object O), and automatically moves the hull 101 along the movement route R when the obstacle corresponding to the object O is present between the hull 101 and the shore structure O1.

According to the various preferred embodiments of the present invention described above, the following advantageous effects are achieved.

According to a preferred embodiment of the present invention, the water area object detection system 103 includes the controller 3 configured or programmed to create the water area map M in which the object presence range F1 including a likelihood that the object O is present is set. The controller 3 is configured or programmed to reduce the object presence range F1 as the distance from the imager 1 of the hull 101 to the feature point F corresponding to the object O decreases, and set the size of the object presence range F1 to the lower limit r1 when the distance from the imager 1 to the feature point F is equal to or less than the predetermined distance d1. Accordingly, when the imager 1 is relatively near the object O such that the distance from the imager 1 to the feature point F is equal to or less than the predetermined distance d1, the size of the object presence range F1 is set to the lower limit r1, and thus an excessive reduction in the object presence range F1 is prevented. Therefore, the possibility that in the water area map M a portion in which the object O is originally present is not included in the object presence range F1, and a gap occurs between the adjacent object presence ranges F1 is reduced or prevented. Therefore, the water area map M that accurately indicates the object O near the imager 1 is created.

According to a preferred embodiment of the present invention, the lower limit r1 is set such that the plurality of object presence ranges F1 for the plurality of feature points F corresponding to the same object O partially overlap each other when the distance from the imager 1 to the feature point F is equal to or less than the predetermined distance d1. Accordingly, when the distance from the imager 1 to the feature point F is equal to or less than the predetermined distance d1, i.e., when each of the plurality of object presence ranges F1 for the plurality of feature points F corresponding to the same object O is relatively small, the plurality of object presence ranges F1 partially overlap each other, and thus the possibility that a portion in which the object O is originally present is not included in the object presence range F1, and a gap occurs between the adjacent object presence ranges F1 is more reliably reduced or prevented. Therefore, the water area map M that still more accurately indicates the object O near the imager 1 is created.

According to a preferred embodiment of the present invention, the controller 3 is configured or programmed to automatically dock the hull 101 by automatically moving the hull 101 toward the shore structure O1 corresponding to the object O. Accordingly, the hull 101 is easily docked at the shore structure O1.

According to a preferred embodiment of the present invention, the controller 3 is configured or programmed to, when the obstacle corresponding to the object O is present between the hull 101 and the shore structure O1 when the hull 101 is automatically docked, set the size of the object presence range F1 to the lower limit r1 or more, set the movement route R that avoids the object presence range F1 around the feature point F corresponding to the obstacle, and automatically move the hull 101 along the movement route R. Accordingly, the sizes of the plurality of object presence ranges F1 indicating the shore structure O1 are set to the lower limit r1 or more, and thus a gap between the plurality of object presence ranges F1 indicating the shore structure O1 is filled. Consequently, when the hull 101 is automatically docked at the shore structure O1, contact of the hull 101 with the obstacle is reduced or prevented.

According to a preferred embodiment of the present invention, the controller 3 is configured or programmed to change the size of the object presence range F1 according to the distance measurement error that quadratically becomes greater as the distance from the imager 1 to the feature point F increases when the distance from the imager 1 to the feature point F is larger than the predetermined distance d1. Accordingly, when the distance from the imager 1 to the feature point F is larger than the predetermined distance d1, the size of the object presence range F1 is set to an appropriate size in consideration of the distance measurement error. Therefore, the water area map M that more accurately indicates the object O imaged by the imager 1 is created.

According to a preferred embodiment of the present invention, the controller 3 is configured or programmed to create the two-dimensional water area map M extending in the horizontal direction by setting the object presence range F1 in the horizontal plane. Accordingly, as compared with a case in which a three-dimensional water area map M is created in consideration of an upward-downward direction (height direction), the processing load on the controller 3 is reduced, and thus the real-time characteristics (responsiveness) of control is improved.

According to a preferred embodiment of the present invention, the controller 3 is configured or programmed to redetect the feature point F corresponding to the object O in the image together with the distance to the feature point F for each predetermined number of imaging frames of the imager 1 to update the water area map M. Accordingly, when an estimation method such as Bayesian estimation is performed, the posterior probability is converged in an earlier stage (an area in which the object O is present has a higher probability, and an area in which the object O is absent has a lower probability).

According to a preferred embodiment of the present invention, the controller 3 is configured or programmed to update the water area map M using Bayesian estimation, and assign the current probability larger than the initial probability and the prior probability to the object presence range F1 and assign the current probability smaller than the initial probability and the prior probability to the range outside the object presence range F1 to calculate the posterior probability using Bayesian estimation. Accordingly, even when noise such as bubbles occurs in a predetermined frame, Bayesian estimation is repeatedly performed to update the water area map M such that the probability that the noise such as bubbles is present in the water area map M is reduced after the noise disappears. Therefore, the noise is reliably removed from the water area map M.

According to a preferred embodiment of the present invention, the imager 1 includes the two imaging light receivers 1a spaced apart at different locations on the hull 101, and the controller 3 is configured or programmed to measure the distance from the imager 1 to the feature point F using the two imaging light receivers 1a. Accordingly, two different images are captured simultaneously by the two imaging light receivers 1a to measure the distance to the feature point F by the triangulation method, and thus as compared with a case in which two images are captured from different locations at different times by a single imaging apparatus to measure the distance to the feature point F by the triangulation method, the accuracy of distance measurement is improved.

According to a preferred embodiment of the present invention, the water area object detection system 103 further includes the display 2 provided on the hull 101 to display the water area map M, and the controller 3 is configured or programmed to perform a control to display one feature point F in one pixel P of the display 2 and set the perfect circular object presence range F1 around one pixel P in which the feature point F is displayed to display the feature point F and the perfect circular object presence range F1 on the display 2. Accordingly, the boundary of the object presence range F1 is set at positions to which distances from the feature point F are equal to each other, and the water area map M that more accurately indicates the object O imaged by the imager 1 is created.

According to a preferred embodiment of the present invention, the controller 3 is configured or programmed to set the predetermined distance d1 to 15 m or more and 25 m or less, and set the size of the object presence range F1 to the lower limit r1 when the distance from the imager 1 to the feature point F is equal to or less than the predetermined distance d1. Accordingly, the size of the object presence range F1 is set to the lower limit r1 within a predetermined range from the imager 1 to the feature point F with the predetermined distance d1 of 15 m or more and 25 m or less, which is a relatively close to the hull 101, and the water area map M that more accurately indicates the object O is created.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

Figure 9:
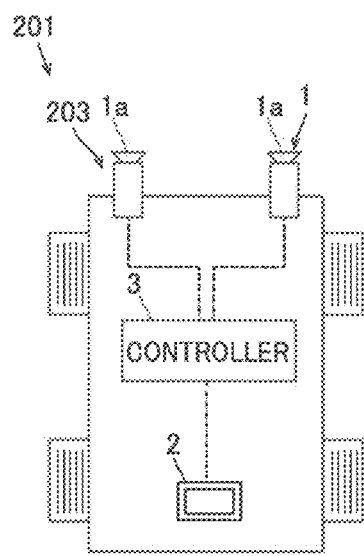
FIG. 9 is a plan view showing a vehicle including a surrounding object detection system according to a modified example.

For example, while the present invention is preferably applied to a marine vessel in preferred embodiments described above, the present invention is not restricted to this. The present invention may alternatively be applied to a vehicle 201 shown in FIG. 9. The vehicle 201 includes a surrounding object detection system 203. The surrounding object detection system 203 includes two imaging light receivers 1a, a display 2, and a controller 3 to create a surrounding map. In addition, the present invention may alternatively be applied to a flying object such as a drone. The vehicle 201 and the flying object are examples of a "mobile body".

While the marine vessel is preferably an outboard motor boat in preferred embodiments described above, the present invention is not restricted to this. In a preferred embodiment of the present invention, the marine vessel may alternatively be a marine vessel other than an outboard motor boat. For example, the marine vessel may be a marine vessel including an inboard motor, an inboard-outboard motor, or a jet propulsion device.

While the imager preferably includes the two imaging light receivers each including a monocular camera in preferred embodiments described above, the present invention is not restricted to this. In a preferred embodiment of the present invention, the imager may alternatively include stereo cameras, for example. Alternatively, the imager may include only one monocular camera. In such a case, the marine vessel preferably includes a highly accurate GPS to detect the position of the hull and a highly accurate inertial measurement unit (IMU) to detect the attitude of the hull.

While the size of one pixel indicating the water area map preferably corresponds to a size of 0.1 m vertically and 0.1 m horizontally in the world coordinate system in preferred embodiments described above, the present invention is not restricted to this. In a preferred embodiment of the present invention, the size of one pixel indicating the water area map may alternatively correspond to a size different from 0.1 m vertically and 0.1 m horizontally in the world coordinate system.

While the predetermined distance to determine a range in which the size of the object presence range is set to the lower limit is preferably 15 m or more and 25 m or less (about 21 m) in preferred embodiments described above, the present invention is not restricted to this. In a preferred embodiment of the present invention, the predetermined distance to determine a range in which the size of the object presence range is set to the lower limit may alternatively be different from 15 m or more and 25 m or less.

While a presence probability of "1" is preferably uniformly assigned to each pixel in the object presence range in Bayesian estimation in preferred embodiments described above, the present invention is not restricted to this. In a preferred embodiment of the present invention, a presence probability of "1" may not be uniformly assigned to each pixel in the object presence range in Bayesian estimation. For example, the presence probability of the feature point may be set to "1", and the presence probability may be decreased according to a Gaussian distribution, for example, as the distance from the feature point increases in the object presence range.

While the object presence range is preferably indicated by a perfect circle in the water area map in preferred embodiments described above, the present invention is not restricted to this. In a preferred embodiment of the present invention, the object presence range may alternatively be indicated by a shape different from a perfect circle, such as an ellipse.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A water area object detection system comprising:
an imager provided on a hull to capture an image around the hull; and
a controller configured or programmed to perform a control to detect a feature point corresponding to an object in the image together with a distance to the feature point based on the image captured by the imager to create a water area map in which an object presence range indicating a range in which the object is probabilistically present is set around the feature point; wherein
the controller is configured or programmed to reduce the object presence range as the distance from the imager of the hull to the feature point corresponding to the object decreases, and set a size of the object presence range to a lower limit when the distance from the imager to the feature point is equal to or less than a predetermined distance.

2. The water area object detection system according to claim 1, wherein the lower limit is set such that a plurality of the object presence ranges for a plurality of the feature points corresponding to the same object partially overlap each other when the distance from the imager to the feature point is equal to or less than the predetermined distance.

3. The water area object detection system according to claim 1, wherein the controller is configured or programmed to automatically dock the hull by automatically moving the hull toward a shore structure corresponding to the object.

4. The water area object detection system according to claim 3, wherein the controller is configured or programmed to, when the object is present between the hull and the shore structure when the hull is automatically docked, set the size of the object presence range to the lower limit or more, set a movement route that avoids the object presence range around the feature point corresponding to the object, and automatically move the hull along the movement route.

5. The water area object detection system according to claim 1, wherein the controller is configured or programmed to change the size of the object presence range according to a distance measurement error that quadratically becomes greater as the distance from the imager to the feature point increases when the distance from the imager to the feature point is larger than the predetermined distance.

6. The water area object detection system according to claim 1, wherein the controller is configured or programmed to create the two-dimensional water area map to be extending horizontally by setting the object presence range in a horizontal plane.

7. The water area object detection system according to claim 1, wherein the controller is configured or programmed to redetect the feature point corresponding to the object in the image together with the distance to the feature point for each predetermined number of imaging frames of the imager to update the water area map.

8. The water area object detection system according to claim 7, wherein the controller is configured or programmed to:
update the water area map using Bayesian estimation; and
assign a current probability larger than an initial probability and a prior probability to the object presence range and assign a current probability smaller than the initial probability and the prior probability to a range outside the object presence range to calculate a posterior probability using the Bayesian estimation.

9. The water area object detection system according to claim 1, wherein the imager includes two imaging light receivers spaced apart at different locations on the hull; and
the controller is configured or programmed to measure the distance from the imager to the feature point using the two imaging light receivers.

10. The water area object detection system according to claim 1, further comprising:
a display provided on the hull to display the water area map; wherein
the controller is configured or programmed to perform a control to display the feature point in one pixel of the display and set the object presence range having a perfect circular shape around the one pixel in which the feature point is displayed to display the feature point and the object presence range on the display.

11. The water area object detection system according to claim 1, wherein the controller is configured or programmed to set the predetermined distance to about 15 m or more and about 25 m or less, and set the size of the object presence range to the lower limit when the distance from the imager to the feature point is equal to or less than the predetermined distance.

12. A marine vessel comprising:
a hull; and
a water area object detection system provided on or in the hull; wherein
the water area object detection system includes:
an imager provided on the hull to capture an image around the hull; and
a controller configured or programmed to perform a control to detect a feature point corresponding to an object in the image together with a distance to the feature point based on the image captured by the imager to create a water area map in which an object presence range indicating a range in which the object is probabilistically present is set around the feature point; wherein
the controller is configured or programmed to reduce the object presence range as the distance from the imager of the hull to the feature point corresponding to the object decreases, and set a size of the object presence range to a lower limit when the distance from the imager to the feature point is equal to or less than a predetermined distance.

13. The marine vessel according to claim 12, wherein the lower limit is set such that a plurality of the object presence ranges for a plurality of the feature points corresponding to the same object partially overlap each other when the distance from the imager to the feature point is equal to or less than the predetermined distance.

14. The marine vessel according to claim 12, wherein the controller is configured or programmed to automatically dock the hull by automatically moving the hull toward a shore structure corresponding to the object.

15. The marine vessel according to claim 14, wherein the controller is configured or programmed to, when an obstacle corresponding to the object is present between the hull and the shore structure when the hull is automatically docked, set the size of the object presence range to the lower limit or more, set a movement route that avoids the object presence range around the feature point corresponding to the obstacle, and automatically move the hull along the movement route.

16. The marine vessel according to claim 12, wherein the controller is configured or programmed to change the size of the object presence range according to a distance measurement error that quadratically becomes greater as the distance from the imager to the feature point increases when the distance from the imager to the feature point is larger than the predetermined distance.

17. The marine vessel according to claim 12, wherein the controller is configured or programmed to create the two-dimensional water area map to be horizontally extending by setting the object presence range in a horizontal plane.

18. The marine vessel according to claim 12, wherein the controller is configured or programmed to redetect the feature point corresponding to the object in the image together with the distance to the feature point for each predetermined number of imaging frames of the imager to update the water area map.

19. The marine vessel according to claim 18, wherein the controller is configured or programmed to:
   update the water area map using Bayesian estimation; and
   assign a current probability larger than an initial probability and a prior probability to the object presence range and assign a current probability smaller than the initial probability and the prior probability to a range outside the object presence range to calculate a posterior probability using the Bayesian estimation.

20. A surrounding object detection system comprising:
   an imager provided on a mobile body to capture an image around the mobile body; and
   a controller configured or programmed to perform a control to detect a feature point corresponding to an object in the image together with a distance to the feature point based on the image captured by the imager to create a surrounding map in which an object presence range indicating a range in which the object is probabilistically present is set around the feature point; wherein
   the controller is configured or programmed to reduce the object presence range as the distance from the imager of the mobile body to the feature point corresponding to the object decreases, and set a size of the object presence range to a lower limit when the distance from the imager to the feature point is equal to or less than a predetermined distance.

* * * * *